(12) United States Patent
Yoon et al.

(10) Patent No.: US 9,077,044 B2
(45) Date of Patent: Jul. 7, 2015

(54) ANODE MATERIAL

(75) Inventors: Sang-Young Yoon, Bedford, MA (US); Rocco Iocco, Beverly, MA (US); Matthew Reynold Denlinger, Waltham, MA (US)

(73) Assignee: A123 Systems LLC, Waltham, MA (US)

( * ) Notice: Subject to any disclaimer, the term of this patent is extended or adjusted under 35 U.S.C. 154(b) by 0 days.

(21) Appl. No.: 13/517,903

(22) PCT Filed: Dec. 21, 2010

(86) PCT No.: PCT/US2010/061631
§ 371 (c)(1),
(2), (4) Date: Oct. 25, 2012

(87) PCT Pub. No.: WO2011/084817
PCT Pub. Date: Jul. 14, 2011

(65) Prior Publication Data
US 2013/0040203 A1 Feb. 14, 2013

Related U.S. Application Data

(60) Provisional application No. 61/288,595, filed on Dec. 21, 2009.

(51) Int. Cl.
| | |
|---|---|
| *H01M 10/052* | (2010.01) |
| *H01M 4/1393* | (2010.01) |
| *H01M 4/587* | (2010.01) |
| *H01M 4/02* | (2006.01) |
| *C01B 31/04* | (2006.01) |
| *H01M 4/505* | (2010.01) |
| *H01M 4/525* | (2010.01) |
| *H01M 4/58* | (2010.01) |

(52) U.S. Cl.
CPC .............. *H01M 10/052* (2013.01); *C01B 31/04* (2013.01); *H01M 4/1393* (2013.01); *H01M 4/505* (2013.01); *H01M 4/525* (2013.01); *H01M 4/5825* (2013.01); *H01M 4/587* (2013.01); *Y02E 60/122* (2013.01)

(58) Field of Classification Search
None
See application file for complete search history.

(56) References Cited

U.S. PATENT DOCUMENTS

| | | | | |
|---|---|---|---|---|
| 6,767,669 | B2 * | 7/2004 | Matsubara et al. | 429/231.8 |
| 2004/0099526 | A1 * | 5/2004 | Ito et al. | 204/291 |
| 2009/0202917 | A1 * | 8/2009 | Sotowa et al. | 429/311 |

* cited by examiner

*Primary Examiner* — Sarah A Slifka
(74) *Attorney, Agent, or Firm* — Alleman Hall McCoy Russell & Tuttle LLP

(57) ABSTRACT

The present disclosure relates to anode materials having high surface areas and improved cycle performance made by surface treatments of spheroidized graphite powders. The surface treatments provide a high surface area protective coating over the spheroidized graphite powder. The anodes made according to the disclosed embodiments have improved cycle life and long term high temperature storage performance. In the disclosed embodiments, a spheroidized graphite powder is coated with a high surface area protective coating. The high surface area protective coating improves the performance and durability of an anode made from disclosed material. The high surface area protective coating can include polymers, metal compounds and/or hard carbon. Further, in some embodiments, a protective coating, that may or may not have a high surface area but does have increased durability, can be formed by heat treating the spheroidized graphite in oxidizing or inert atmospheres.

15 Claims, 1 Drawing Sheet

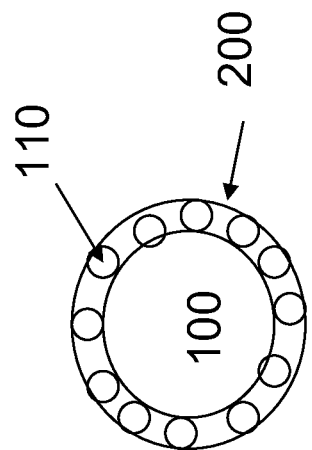
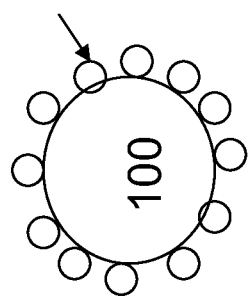
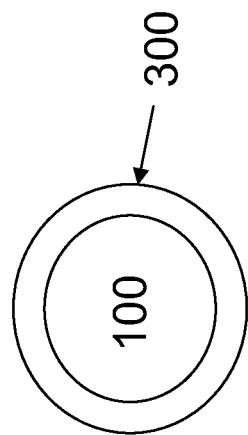

ANODE MATERIAL

CROSS REFERENCE TO RELATED APPLICATIONS

This application claims the benefit of U.S. Provisional Application 61/288,595, filed on Dec. 21, 2009, the entire contents of which are hereby incorporated by reference.

BACKGROUND

Battery manufacturers are continuing to increase energy density, power characteristics, cycle life and safety characteristics, while decreasing the cost, of anode materials. Flaky natural graphite can be used as an anode material by transforming it into spherical particles through a process called spheroidization. Crystalline flake graphite (or flake graphite for short) occurs as isolated, flat, plate-like particles with hexagonal edges if unbroken and when broken the edges can be irregular or angular. Spheroidization of flake graphite can be accomplished by repeated pulverization of the flake graphite with a relatively small impact mill such as an air classifier mill (ACM) or pin mill. When pulverization is conducted, it is necessary to repeat the operation at least 10 times to produce a spherical shape with a high powder density. In order to obtain the targeted particle size (e.g., about 8-20 µm average), the average diameter of raw and flaky natural graphite should be about 1 µm to 50 µm. This finalized spheroidized powder can be used as an anode active material in a battery, for example, a lithium ion battery. Spheriodized graphite powder is typically a high surface area material that is useful to make anodes for high power, i.e., low impedance or low direct current resistance, battery applications. However, the efficiency of first charge and discharge of an anode made from this material is usually too low to achieve promising cell capacity. In addition, high temperature storage performance, i.e., good calendar life, is also poor for such anodes. The high surface area graphite powder does not perform well as at higher temperatures because of the loss of cyclable lithium generated from the solid electrolyte interphase (SEI) film reformation with electrolyte during cycling, i.e., during operation, and high temperature storage.

Instead, in order to increase the durability, i.e., cycle performance, of the natural graphite powders, the graphite is coated with pitch, which reduces the surface area of the graphite powder, but also increases the durability of the anode. Pitch is the name for any of a number of viscoelastic, solid polymers. Pitch can be made from petroleum products or plants. Pitch coated natural graphite is widely used for consumer battery applications such as laptops and cell phones. Pitch coated natural graphite is used because of its durability and low cost. Pitch coated graphite powder is good for cycling at low rate and calendar life (long term high temperature storage) because the pitch coating can minimize the side reactions with the electrolyte during cycling and high temperature storage. However, the pitch coating reduces the surface area of the active sites on the anode particles.

Because of the reduced surface area of the pitch coated graphite, cycle performance of the pitch coated anode materials is not well suited to a high power automotive application. With pitch coated anode materials, the interface between the pitch coated layer and the core graphite deteriorates during high power cycling operations. Accordingly, slightly higher surface area graphite powder has been used for high power applications.

The surface area of the anode powder is an important part of a lithium ion battery cell which affects cycling, storage, and safety performances of the battery. Appropriate surface area of anode powder will allow rapid reaction with lithium ions in the electrolyte. A high surface area anode, such as spheroidized graphite also can be good for regeneration power and high discharge cycling. A low surface area pitch coated graphite anode material performs well in terms on durability, but is not ideal for a high power application. Thus, an anode powder that creates a durable anode for high power applications is needed.

SUMMARY

In one aspect, the present disclosure relates to an anode powder. The anode powder includes a spheroidized graphite powder and a high surface area protective coating surrounding the graphite powder, wherein, the coated powder has a higher surface area than the untreated graphite powder. In some embodiments, the anode powder has a particle size between about 5 µm and about 20 µm. In some embodiments, the anode powder has a surface area between about 5 $m^2/g$ and about 20 $m^2/g$. In some embodiments, the anode powder has a Raman spectroscopy peak intensity ratio of D band/G band less than 0.3. In some embodiments, the anode powder has a Raman spectroscopy peak intensity ratio of D band/G band above about 0.3. In some embodiments, the high surface area protective coating can be a metal compound powder. In some embodiments, the metal compound powder includes a metal oxide powder. In some embodiments, the metal oxide powder is selected from $Al_2O_3$, $Y_2O_3$, $TiO_2$, $Cs_2O_3$, $ZrO_2$, and ZnO. In some embodiments, the metal compound powder can be a metal fluoride powder. In some embodiments, the metal fluoride powder can be $AlF_3$, $ZrF_4$, $TiF_4$, $CsF_3$, $YF_3$, or $ZnF_2$. In some embodiments, the high surface area protective coating can be a mixture of metal compound powder and polymer. In some embodiments, the high surface area protective coating can be a hard carbon coating. In some embodiments, the coating has an oxygen content of between about 1% and about 6%. In some embodiments, the coating has a carbon, oxygen double bond percentage of above about 3%.

Another aspect of the disclosure relates to a method of making an anode powder. The method includes providing a spheroidized graphite powder, coating the graphite powder with a high surface area protective coating, and heat treating the coated graphite power to form an anode material that has a higher surface area than the untreated graphite powder. In some embodiments, the anode powder has a surface area between about 5 $m^2/g$ and about 20 $m^2/g$. In some embodiments, the anode powder has a Raman spectroscopy peak intensity ratio of D band/G band less than 0.3. In some embodiments, the anode powder has a Raman spectroscopy peak intensity ratio of D band/G band above about 0.3. In some embodiments, the method includes heat treating the coated graphite powder in an oxidizing atmosphere. In some embodiments, the method includes heat treating the coated graphite powder in an inert atmosphere. In some embodiments, coating can be coating the spheroidized graphite powder with a metal compound powder. In some embodiments, coating can be coating the spheroidized graphite powder with a metal oxide powder. In some embodiments, the metal oxide powder is selected from the group consisting of $Al_2O_3$, $Y_2O_3$, $TiO_2$, $Cs_2O_3$, and ZnO. In some embodiments, the coating comprises coating the spheroidized graphite powder with a metal fluoride powder. In some embodiments, the metal fluoride powder is selected from the group consisting of $AlF_3$, $ZrF_4$, $TiF_4$, $CsF_3$, $YF_3$, and $ZnF_2$. In some embodiments, coating can be coating the spheroidized graphite powder with a hard carbon precursor.

Another aspect of the present disclosure relates to an anode. The anode includes an anode layer disposed on a conductive sheet, the anode layer including an electroactive powder, the electroactive powder including: a spheroidized graphite powder; and a high surface area protective coating surrounding the graphite powder; wherein, the coated powder has a higher surface area than the untreated graphite powder.

Another aspect relates to a battery. The battery includes a cathode, an anode, wherein the anode includes an anode powder, the anode powder including a spheroidized graphite powder and a high surface area protective coating surrounding the graphite powder, wherein, the coated powder has a higher surface area than the untreated graphite powder; and an electrolyte in ionic communication with both the cathode and the anode.

BRIEF DESCRIPTION OF THE DRAWINGS

For a more complete understanding of various embodiments of the present disclosure, reference is now made to the following descriptions taken in connection with the accompanying drawings in which:

FIG. 1 illustrates a metal compound coated anode powder particle according embodiments of the present disclosure;

FIG. 2 illustrates a metal compound/polymer coated anode powder particle according embodiments of the present disclosure;

FIG. 3 illustrates a hard carbon coated anode powder particle according embodiments of the present disclosure.

DESCRIPTION

The present disclosure relates to anode materials having high surface areas and improved cycle performance made by surface treatments of spheroidized graphite powders. The surface treatments provide a high surface area protective coating over the spheroidized graphite powder. The anodes made according to the disclosed embodiments have improved cycle life and long term high temperature storage performance. In the embodiments discussed below, a spheroidized graphite powder is coated with a high surface area protective coating. The high surface area protective coating improves the performance and durability of an anode made from disclosed material. The high surface area protective coating can include polymers, metal compound and/or hard carbon. Further, in some embodiments, a protective coating, that may or may not have a high surface area but does have increased durability, can be formed by heat treating the spheroidized graphite in oxidizing or inert atmospheres.

Lithium Ion Batteries

A lithium-ion battery (sometimes called Li-ion battery or LIB) is a family of rechargeable battery types in which lithium ions move from the negative electrode to the positive electrode during discharge, and back when charging. Chemistry, performance, cost, and safety characteristics vary across LIB types. Unlike lithium primary batteries (which are disposable), lithium-ion cells use an intercalated lithium compound as the electrode material instead of metallic lithium.

The three primary functional components of a lithium-ion battery are the anode, cathode, and electrolyte. The anode of a conventional lithium-ion cell is made from carbon, the cathode is a metal oxide, and the electrolyte is a lithium salt in an organic solvent. The most commercially popular anode material is graphite. Typically, the anode material is disposed on a conductive sheet and contains an electroactive powder. The cathode is generally one of three materials: a layered oxide (such as lithium cobalt oxide); a polyanion (such as lithium iron phosphate); or a spinel (such as lithium manganese oxide). The electrolyte is typically a mixture of organic carbonates such as ethylene carbonate or diethyl carbonate containing complexes of lithium ions. These non-aqueous electrolytes generally use non-coordinating anion salts such as lithium hexafluorophosphate ($LiPF_6$); lithium hexafluoroarsenate monohydrate ($LiAsF_6$); lithium perchlorate ($LiClO_4$); lithium tetrafluoroborate ($LiBF_4$); and lithium triflate ($LiCF_3SO_3$) and are in ionic communication with both the anode and the cathode.

Depending on materials choices, the voltage, capacity, life, and safety of a lithium-ion battery can change dramatically.

Pure lithium is highly reactive. It reacts vigorously with water to form lithium hydroxide and hydrogen gas is liberated. Thus, a non-aqueous electrolyte is typically used, and a sealed container rigidly excludes water from the battery pack.

The present disclosure relates to improvements to the anode of the lithium ion battery. In particular, the described embodiments relate to an improved anode powder that can increase the performance and durability of the anode and the battery itself. By maximizing the surface area of the anode powder and providing a protective coating to the anode powder, an anode material that has high performance and good durability can be made.

Metal Compound Powder Coating

In one aspect, the disclosure relates to a high power, durable anode material having a metal compound powder coating. In one embodiment, as shown in FIG. 1, the anode material includes a spheroidized graphite powder 100 coated with a plurality of metal compound powder particles 110 to form a metal compound powder coated anode powder. The graphite powder has a diameter of about 8 to 20 microns. The metal compound powder coating can be a layer of a metal oxide or metal fluoride. The metal compound powder layer can have a thickness of about a few nanometers to about 50 nanometers. Further, the metal compound powder layer is not necessarily a continuous layer of metal compound powder particles.

In another embodiment, as shown in FIG. 2, the metal compound powder particles 110 can be added to a polymer coating layer 200 on the spheriodized graphite powder 100 to form a metal compound polymer coating composite. The metal compound polymer composite layer can have a thickness of about a few nanometers to about 50 nanometers. The polymer coating layer 200 can be, for example, amorphous carbon, hard carbon precursors or soft carbon precursors. Hard carbon is formed by thermally decomposing a polymer resin. Exemplary hard carbon precursors include polyimide resin, furan resin, phenol resin, polyvinyl alcohol resin, cellulose resin, epoxy resin, and polystyrene resin. The hard carbon polymers can be used with or without curing agent. Soft carbon can be pitch materials. Exemplary soft carbon precursors include petroleum pitch, coat tar pitch, and chemically processed pitches. Preferred compounds include those with high carbon content after thermal decomposition, for example, the carbon content being in the range of about 1% to about 10% . . . . Additionally, other active additives can be used in addition to the metal compound powder and polymer, for example, conducting carbon or carbon black. In the metal compound polymer composite coating the polymer coating layer can support the metal compound powder on the graphite surface. The particle size of metal compound powder in both examples is typically in the range of about 10 nm to about 500 nm. The metal compound powder also has a high surface area, e.g., 50-100 $m^2$/gram. Accordingly, the nano metal compound powder particles have a higher surface area than the natural graphite materials (having a surface area of about 0.5 m²/g to 6 m²/g). When these metal compound powder particles are added to the graphite, they increase the surface area of the composite coated particle. As discussed above, for a high power application, a higher surface area is needed to obtain the high power performance. Therefore, by introducing metal compound powder into the graphite powder, anodes for high power or high energy density lithium ion cells can be manufactured.

Further, the metal compound powder also increases the long term storage performance of the anode. The additional metal compound powder material can help obtain better electrolyte wetting, which improves electrolyte graphite surface contact during cycling. Further, the addition of the metal compound powder can produce anode materials with good calendar life, including both a long cycle life, e.g., the anode will not deteriorate during use, and good storage performance, e.g., the anode will not deteriorate during storage.

The metal compound powder coated graphite powder can be a hydrogen fluoride (HF) scavenger to improve long term cycle life and high temperature storage performance. If the cell has retained moisture, the moisture can react with $LiPF_6$ salt (a common electrolyte salt used in lithium ion batteries) forming a strong acid (HF) which may deteriorate the cathode material. Prior systems have added metal compound powder into the formed electrode to react with the HF once it is formed, i.e., the metal compound powder was mixed with the polymer binder of the electrode. However, it is difficult to uniformly distribute the metal compound powder into the electrode during the mixing and coating processes and a large amount of metal compound powder was needed to achieve a desirable improvement in performance. Here, however, a method for preparing uniformly coated metal compound powder on the graphite active material prior to formation of the electrode is described. The mechano-chemical process discussed below permits a uniform application of the metal compound powder to the graphite powder. The metal compound powder is inert and non-reactive with polymer material during a carbonization process. Therefore, it is possible to achieve molecular level uniform mixing on the graphite powder while simultaneously reducing the amount of metal compound powder used and maximizing the capacity on the anode.

The metal compound powder can be a metal oxide can be selected from $Al_2O_3$, $Y_2O_3$, $TiO_2$, $Cs_2O_3$, ZnO, $ZrO_2$ and other similar metal oxides or fluorides, for example, those from an amphoteric element compound, i.e., a compound that can react as either an acid or a base. For example, alumina can react with HF and reduce the formation of LiF, which can deteriorate the cell performance by consuming HF through a side reaction. The metal compound powder also can be a metal fluoride, for example, one of $AlF_3$, $ZrF_4$, $TiF_4$, $CsF_3$, $YF_3$, and $ZnF_2$.

In another embodiment, nano scale silicon or tin metal powder can be added, in addition to the metal compounds discussed above, during the process of spheroidization and pitch coating. In this embodiment, the graphite material retains the conducting pathway and high capacity during cycling, even if the metal compound breaks down.

In another embodiment, to improve performance capacity of the graphite material, a secondary metal powder and/or metal oxide powder can be added, e.g., Si, Ag, Fe, Pd, Pb, Al, Si, or In. Preferably, one or more SiO or SnO or $SnO_2$ powder is added to the graphite powder and polymer. The added SiO or SnO or $SnO_2$ powder in the final anode product can react with the lithium of the lithium battery to improve the capacity of the anode material. This process can improve uniform distribution of the metal powder between the primary graphite particles boundaries. Therefore, the final product would contain composite particles of graphite, the primary metal compound powders and polymers mentioned above, and the secondary metal powders and/or oxides described in this paragraph. This graphite interlocked structure with the secondary metal oxide powder can facilitate high capacity and better cycle performance because the conducting path can be preserved throughout the active material powder. The described material can produce electrodes with a long cycle and improved storage performance. Further, the described material contributes to improved processing, especially electrolyte wetting.

Once the spheroidized graphite powder is coated with the metal compound powder or the metal compound powder/polymer composite, the coated graphite can be heat treated. The heat treatment increases cycling and storage performance. The heat treatment can occur in an oxidizing atmosphere or in an inert atmosphere. The above anode powders keep the surface area high by adding a high surface area metal oxide such as alumina or a hard carbon precursor and heat treatment in order to produce an anode that will have required cycle and long term storage performance.

Hard Carbon Coating

In another embodiment, as shown in FIG. 3, a hard carbon coating 300 can be employed to improve the cycle performance of the anode material. The hard carbon coating 300 has a higher surface area than the graphite powder 100; therefore, the coating of the graphite powder 100 with the hard carbon coating 300 increases the surface area of the finalized anode powder. The hard carbon coating 300 is formed by thermally decomposing a hard carbon precursor, for example, a polymer resin, for example, phenol-novolac resin is decomposed into a high surface area high carbon content hard carbon coating that achieves the higher surface area and better cycle performance when coated on the spheriodized graphite particles 100. The same materials can be used as for the hard carbon precursor in the second metal compound embodiment discussed above. For the hard carbon coating, it is possible to use a synthetic polymer. That is, polyimide resin, furan resin, phenol resin, polyvinyl alcohol resin, cellulose resin, epoxy resin, polystyrene resin, and carbonhydrate materials such as sugars and polyacrylonitrlies, etc. can be used as the hard carbon coating. Preferred compounds include those compounds with high carbon content after thermal decomposition, for example, between about 1% to about 10% cachon. To improve coating yield and properties of surface area, the powder type hard carbon precursor is used with the curing agent of hexamethylenediamine and is treated to make the precursor thermoplastic. Further, the localized heating caused by high shear and compressive forces of the processing creates fused composite particles without using a solvent. This process is suitable for making the coating process inexpensive. Wet methods also can be applicable to achieve hard carbon layer by using the solvent soluble polymer resin and by using an additional heat treatment in inert atmosphere.

Anode powders made with a hard carbon precursor coating can have a surface area between about 5 m²/g to about 20 m²/g and a Raman spectroscopy peak intensity ratio of D band/G band above about 0.3. The surface area of a hard carbon coating can be 10 m²/g to about 1,000 m²/g. The highest surface areas can be obtained if using 100% hard carbon and heat treatment at 100 degrees Celsius. The oxygen percentage in the hard carbon coating can be about 1% to about 6%. The carbon oxygen double bond percentage can be higher than 3%.

Methods

Five different methods were applied to spheroidized graphite powder to create an anode powder having a long cycle life and improved storage performance while keeping a high surface area, compared to the prior art pitch coated and non-treated powders anode materials. The five methods include:

1. Metal compound powder and polymer coating of graphite powder, followed by heat treatment of coated graphite powder in oxidizing atmosphere;
2. Metal compound powder coating of graphite powder, followed by heat treatment of coated graphite powder in inert atmosphere;
3. Heat treatment of graphite powder in oxidizing atmosphere;
4. Heat treatment of graphite powder in inert atmosphere; and
5. Hard carbon precursor coating of graphite powder.

Metal Compound Powder Anode Method

In the first embodiment, a metal compound powder and polymer coating are combined for a composite coating of the graphite powder. In the second embodiment, the metal compound powder can be coated directly on the spheroidized powder without a polymer coating. After metal compound powder coating, a heat treatment is conducted on the polymer/metal compound powder coated graphite powder in inert atmosphere. The metal compound powder is retained or implemented on the graphite powder surface by shear stresses between particles during mechano-chemical process. In both embodiments, the coating of metal compound powder nanoparticles is conducted by high shear and compressive forces which creates composite particles without using a solvent. In other words, a mechano-chemical coating process was used for this metal compound powder coating. In this mechanical process, the graphite powder can be damaged (as discussed below) and may need to be recovered by the additional heat treatment in oxidizing and inert atmosphere. Other wet methods can be applicable to this metal compound coating by using a water or solvent soluble metal compound and by using an additional heat treatment in oxidizing or inert atmosphere.

Heat Treatment

In other embodiments, the protective coating for the graphite powder is formed by heat treatment of the spheroidized graphite powder. The heat treatment can occur in an oxidizing atmosphere or an inert atmosphere. The heat treatment can be used to lower irreversible capacity loss by reducing the damaged portions of the graphite powder resulting from the spheroidization and/or coating process. For example, during the spheroidization process, the crystalline graphite can become disordered. The disordered sections can be more active than the crystalline sections of the graphite. The disordered sections are more fragile than the crystalline sections. Therefore, the disordered sections can become damaged or can break down during cycling, thereby decreasing the durability of the anode. In the coating processing the high shear and compressive forces also can damage the crystalline structure of the graphite. Heat treatment can remove these damaged sections of the graphite and improve the graphite crystalline structure of the particle. Therefore, the heat treatment process can improve the durability of the finalized anode product. The electrochemical characteristics of oxidized graphite have been reported by several groups, for example, Peled et al. (E. Peled, et al. J. Electrochem. Soc., 143 (1996)) and Wu et al. (Y. P. Wu. et al, Solid State Ionics, 156 (2003)). In these studies, the anode's efficiency was increased, the irreversible capacity loss was decreased, and cycle performance was improved by eliminating structural disordered surfaces during the previous spheroidization.

Further, the heat treatment process can deposit functional groups, for example, C=O on the surface of the graphite. With the addition of these functional groups, the SEI film becomes more stable. The increased stability increases the durability and cycling performance of the anode because there is no side reaction with the electrolyte during cycling and long term storage. Therefore, the heat treatment can improve the cycle performance of the anode.

Typically, the temperature range of the heat treatment is from 500° C. to 1000° C. in oxidizing atmosphere. If the temperature is too low, no oxidation reaction occurs. If the temperature is too high, product yield will be too low because of the excess reaction of oxygen with carbon, resulting in more production of $CO_2$ and a greater loss of carbon active material.

The temperature range of the heat treatment is from 900° C. to 2200° C. in inert atmosphere. If the temperature is too low, disordered parts, i.e., graphite edge particles having a high surface area as a result of the spheroidization process, are not recovered. If the temperature is too high, the cost is high, the efficiency can be lower and the cycle performance can be worse due to a highly ordered graphitic surface and low efficiency of the effective material.

The anode powders made according to the above methods can have a surface area between about 5 $m^2/g$ and about 20 $m^2/g$ and a Raman spectroscopy peak intensity ratio of D band/G band less than about 0.4. The oxygen percentage in the heat treated coatings can be about 1% to about 6%. The carbon oxygen double bond percentage can be between higher than 3%.

Hard Carbon Coating

In another embodiment, the graphite powder can be coated with a hard carbon coating. The hard carbon coating is formed by thermally decomposing a hard carbon precursor, for example, a polymer resin, for example, phenol-novolac resin is decomposed into a high surface area high carbon content hard carbon coating that achieves the higher surface area and better cycle performance when coated on the spheriodized graphite particle. To improve coating yield and properties of surface area, the powder type hard carbon precursor is used with the curing agent of hexamethylenediamine and is treated to make the precursor thermoplastic. The localized heating caused by high shear and compressive forces creates fused composite particles without using a solvent. This process is suitable for making the coating process inexpensive. In addition, other wet methods can be applicable to achieve hard carbon layer by using the solvent soluble polymer resin and by using the additional heat treatment in inert atmosphere. The solvent can be an organic or in organic solvent. The exemplary thereof includes toluene, benzene, tetrahydrofuran, xylene, methanol, ethanol, hexane, cyclohexane, or water or a mixture thereof.

Safety Concerns

The high surface area anode material made from all the above methods can deteriorate the safety characteristics of the anode because of high reaction site with electrolyte on anode side. Thus, a water based styrene-butadiene rubber (SBR)/carboxymethyl cellulose (CMC) binder can be used in the anode composition to manage the safety performance of the disclosed high surface area anode material. The SBR/CMC can be added when the electrode is made. But, it is not limited to the binder selection such as polyimide, PAA (Poly(acrylic acid)), and PVDF (Polyvinylidene fluoride), etc.

EXAMPLES

The following describes manufacture and testing of anodes according to embodiments of the present disclosure and the prior art.

Example 1

$Al_2O_3$/Pitch Coating/Heat Treatment in Inert Atmosphere $Al_2O_3$ nanoparticles and pitch powder was added to an already spheroidized graphite powder in the following ratios: 2% $Al_2O_3$ and 3% pitch powder, relative to the spheroidized graphite, i.e., 2:3:95 $Al_2O_3$ pitch: graphite. This mixture was mechanically mixed using high shear and compressive forces to create fused, uniform composite particles. The pitch coating was carbonized in a tube furnace in an inert atmosphere (either nitrogen or argon) by first heating to 600° C. at a rate of 4° C./min and then continuing to heat at a rate of 10° C./min up to 1000° C. The temperature was held at 1000° C. for 2 hours before the furnace was allowed to cool to ambient temperature with no forced cooling. The gas flow rate was 2.75 SLPM.

The electrode was made by coating copper foil with a water-based slurry that contained (by weight) 41.4% $Al_2O_3$/pitch coated graphite, 0.724% SBR, 0.426% CMC, and 57.4% water. After drying at 100° C. for 10 minutes, the electrode coating weight was approximately 5 mg/cm². The electrodes are then pressed to a thickness of 35 μm (one sided, not including foil thickness).

First charge capacity, reversible capacity, and efficiency were determined by CR2025 coin cells, using excess lithium as the counter electrode.

Cylindrical 18650 cells were built using a standard nanophosphate cathode. The cycle life was tested under +1 C/−2 C charge/discharge rates. High temperature storage was tested at 60° C., to determine resistance growth, recovered capacity, and retained capacity. Discharge rate was tested at 1 A, 5 A, 10 A, 20 A, and 30 A at room temperature. Safety was tested using a nail penetration test that was conducted at 100% state of charge (SOC) and 60° C.

Example 2

$Al_2O_3$ Coating/Heat Treatment in Oxidizing Atmosphere

2% $Al_2O_3$ nanoparticles were added to an already spheroidized graphite powder. This mixture was mechanically mixed using high shear and compressive forces to create fused, uniform composite particles. This powder was heat treated in air or another oxidizing environment. Compressed air was used at a flow rate of 1.14-4.25 SLPM. The furnace was heated to 550° C. at a rate of 10° C./min, and held at 550° C. for 8 hours. The furnace was then allowed to cool to ambient temperature with no forced cooling.

The electrode build method and testing by coin cell and 18650 cells was identical to the method used in Example 1.

Example 3

Heat Treatment in Oxidizing Atmosphere

Spheroidized graphite powder with a particle size ranging from 8-20 μm (average 15 um) was heat treated in air or another oxidizing environment. Compressed air was used at a flow rate of 1.14-4.25 SLPM. The furnace was heated to 550° C. at a rate of 10° C./min, and held at 550° C. for 8 hours. The furnace was then allowed to cool to ambient temperature with no forced cooling.

The electrode build method and testing by coin cell and 18650 cells was identical to the method used in Example 1.

Example 4

Heat Treatment in Inert Atmosphere

Spheroidized graphite powder with a particle size ranging from 8-20 μm was heat treated in nitrogen by first heating to 600° C. at a rate of 5° C./min and then continuing to heat at a rate of 10° C./min up to 1200° C. The temperature was held at 1200° C. for 2 hours before the furnace was allowed to cool to ambient temperature with no forced cooling. The gas flow rate was 2.75 SLPM.

The electrode build method and testing by coin cell and 18650 cells was identical to the method used in Example 1.

Example 5

Hard Carbon Precursor Coating

4% phenol-novolac resin powder (hard carbon precursor) was added to an already spheroidized graphite powder. This mixture was mechanically mixed using high shear and compressive forces which created fused, uniform composite particles. The hard carbon precursor coating was carbonized in a tube furnace in an inert atmosphere (either nitrogen or argon) by first heating to 150° C. at a rate of 10° C./min. After holding at 150° C. for 10 minutes, the rate was reduced to 4° C./min until 600° C. was reached. Simultaneously, the heating rate was increased again to a rate of 10° C./min, up to 1000° C. The temperature was held at 1000° C. for 2 hours before the furnace was allowed to cool to ambient temperature with no forced cooling. The gas flow rate was 2.75 SLPM.

The electrode build method and testing by coin cell and 18650 cells was identical to the method used in Example 1.

Comparative Example 1

Pitch Coating

5% Pitch powder was added to an already spheroidized graphite powder. This mixture was mechanically mixed using high compressive forces to create fused, uniform composite particles. The pitch coating was carbonized in a tube furnace in an inert atmosphere (either nitrogen or argon) by first heating to 600° C. at a rate of 4° C./min and then continuing to heat at a rate of 10° C./min up to 1000° C. The temperature was held at 1000° C. for 2 hours before the furnace is allowed to cool to ambient temperature with no forced cooling. The gas flow rate is 2.75 SLPM.

The electrode build method and testing by coin cell and 18650 cells was identical to the method used in Example 1. Other performances were okay though. The cycle performance was terrible.

Comparative Example 2

Non-Treatment: As Received and Spheroidized Powder

The spheroidized graphite powder remained untreated and the electrode was built using a method identical Example 1. This powder had reasonable cycle performance but, poor storage performance.

The results of the above five examples and two comparative examples are depicted in tables 1-6, below. For each example, tables 1-6 lists the particle size (median particle diameter, in micrometers). Table 1 lists the 18650 initial performances (including initial capacity in ampere-hours, n-ICL (irreversible capacity loss after formation and storage at 45 C for three days: Ampere-hours), and DCR (direct current resistance in milliohms). Table 2 lists the 18650 performance cycles (remaining % cell capacity after 300 cycles). Table 3 lists the storage performance (including % capacity retention and recovery after four weeks and % DCR growth after four weeks). Table 4 lists the coin cycle performance (remaining % cell capacity after 200 cycles). Table 5 lists the powder surface area ($m^2/g$). Table 6 shows the XPS date including carbon, oxygen, and C=O bond percentages and the Raman spectroscopy data, including D/G peak ratios for the exemplary anode powders.

In order to determine the surface area of the powder, it was first degassed under nitrogen for a minimum of 3 hours at 190° C. It was then measured using the multi-point Brunauer-Emmett-Teller (BET) method. The equipment used was a Micromeritics Gemini 2360 with 10 relative pressure ($P/P_o$) targets between 0.03 and 0.29. The adsorption gas was nitrogen.

Particle size was determined using a Malvern Instruments Mastersizer 2000. The dispersant was water, with 4 drops Triton X-100 surfactant that had been diluted in water to a ration of 1:100.

Raman spectroscopy was conducted to check the surface properties of graphite powder by using Argon laser beam. That is, it has a peak G-band around 1580 cm-1. G-band is a peak which is observed corresponding to a crystalline or ordered structure grown and formed by aromatic rings. In addition to G-band peak, it has another peak D-band around 1360 cm-1. D-band is a peak which is observed corresponding to an irregular or disordered non-crystalline structure. The ratio of peak intensities D-band and G-band become larger as the ratio of disordered structure portion at the surface layer of graphite particles.

X-ray photoelectron spectroscopy (XPS) is an analytical technique for the study of thin material layers that uses x-rays to stimulate desorption of electrons in the near surface region of a specimen. The kinetic energy of these emitted electrons (called photoelectrons) is measured using a hemispherical electron spectrometer. The XPS spectra are generally plotted with binding energy on the horizontal axis and electron intensity on the vertical axis. For XPS analysis, samples were pressed into indium foil for support and attached to stainless steel holders using stainless steel screws and then installed in the vacuum chamber of a VersaProbe XPS Microprobe instrument manufactured by Physical Electronics USA of Chanhassen, Minn. The chamber was evacuated to a base pressure of ≈1×10−8 torr. A hemispherical energy analyzer was used for electron detection. XPS survey spectra were collected to identify the elements present on the sample surfaces and multiplex spectra were collected to calculate elemental compositions. High-resolution spectral data were also collected for the C1s photoelectron line. Data were collected at the surface level using a monochromated aluminum K-alpha x-ray source. XPS spectral data are shown in table 1.

TABLE 1

|  | 18650 initial performance | | | |
| --- | --- | --- | --- | --- |
|  | Particle size, um (D50) | Initial capacity, Ah | n-ICL, % | DCR (mohm) |
| Example 1 | 15.5 | 1.02 | 13.23 | 29.3 |
| Example 2 | 15.4 | 1.01 | 8.01 | 28.1 |
| Example 3 | 15.3 | 1.05 | 13.95 | 29.9 |
| Example 4 | 15.1 | 1.06 | 13.21 | 28.65 |
| Example 5 | 15.9 | | | |
| Comparative 1 | 15.5 | 1.00 | 14.17 | 29.4 |
| Comparative 2 | 15.3 | 1.03 | 19.4 | 28.9 |

TABLE 2

|  | Particle size, um (D50) | 18650 cycle Capacity retention %, 18650 at 300 cyles |
| --- | --- | --- |
| Example 1 | 15.5 | 98 |
| Example 2 | 15.4 | 88 |
| Example 3 | 15.3 | 97 |
| Example 4 | 15.1 | 96 |
| Example 5 | 15.9 | X |
| Comparative 1 | 15.5 | 68 |
| Comparative 2 | 15.3 | 96 |

TABLE 3

|  |  | Storage | | |
| --- | --- | --- | --- | --- |
|  | Particle size, um (D50) | % Retention - 4 weeks | % Recovery - 4 weeks | % DCR Growth - 4 weeks |
| Example 1 | 15.5 | 84.6 | 89 | 10.9 |
| Example 2 | 15.4 | 89.4 | 90.9 | 15.4 |
| Example 3 | 15.3 | 88.3 | 90.3 | 12.3 |
| Example 4 | 15.1 | 88.6 | 89.9 | 2.8 |
| Example 5 | 15.9 | x | X | x |
| Comparative 1 | 15.5 | 88.8 | 90.2 | 16.8 |
| Comparative 2 | 15.3 | 86.4 | 87.9 | 16.2 |

TABLE 4

|  | Particle size, um (D50) | Coin cycle Capacity retention %, at 300 cycles |
| --- | --- | --- |
| Example 1 | 15.5 | 87 |
| Example 2 | 15.4 | X |
| Example 3 | 15.3 | 90 |
| Example 4 | 15.1 | X |
| Example 5 | 15.9 | 92 |
| Comparative 1 | 15.5 | x |
| Comparative 2 | 15.3 | x |

TABLE 5

|  | Particle size, um (D50) | Powder Surface Area $cm_2/g$ |
| --- | --- | --- |
| Example 1 | 15.5 | 5.67 |
| Example 2 | 15.4 | 8.72 |
| Example 3 | 15.3 | 6.43 |
| Example 4 | 15.1 | 6.47 |
| Example 5 | 15.9 | 16.3 |
| Comparative 1 | 15.5 | 4.01 |
| Comparative 2 | 15.3 | 6.75 |

TABLE 6

|  | XPS | | Raman Spectroscopy D/G |
|---|---|---|---|
|  | O, % | C=O, % | Peak ratio |
| Example 2 |  |  | 0.18 |
| Example 3 | 4.69 | 4.66 | 0.09 |
| Example 4 | 2.27 | 4.25 | 0.18 |
| Example 5 | 1.44 | 3.93 | 0.46 |
| Comparative 1 |  |  | 0.53 |
| Comparative 2 | 6.33 | 2.9 | 0.41 |

While examples of the present invention have been shown and described, it will be readily apparent to those skilled in the art that various changes and modifications may be made therein without departing from the scope of the invention.

What is claimed is:

1. An anode powder comprising:
a spheroidized graphite powder;
a high surface area protective coating uniformly surrounding the graphite powder wherein the high surface area protective coating comprises a uniformly fused metal compound powder coated on the graphite powder to form the anode powder and wherein the anode powder has a higher surface area than an untreated graphite powder; and
the high surface area protective coating has a thickness of less than 50 nanometers.

2. The anode powder of claim 1, wherein the anode powder has a particle size between about 5 μm and about 20 μm.

3. The anode powder of claim 1, wherein the anode powder has a surface area between about 5 m²/g and about 20 m²/g.

4. The anode powder of claim 1, wherein the anode powder has a Raman spectroscopy peak intensity ratio of D band/G band less than 0.3.

5. The anode powder of claim 1, wherein the metal compound powder comprises a metal oxide powder.

6. The anode powder of claim 5, wherein the metal oxide powder is selected from the group consisting of $Al_2O_3$, $Y_2O_3$, $TiO_2$, $Cs_2O_3$, $ZrO_2$, and $ZnO$.

7. The anode powder of claim 5, wherein the metal compound powder comprises a metal fluoride powder.

8. The anode powder of claim 7, wherein the metal fluoride powder is selected from the group consisting of $AlF_3$, $ZrF_4$, $TiF_4$, $CsF_3$, $YF_3$, and $ZnF_2$.

9. The anode powder of claim 1, wherein the high surface area protective coating comprises a mixture of metal compound powder and polymer.

10. The anode powder of claim 9, wherein the polymer is a hard carbon precursor material and the high surface area protective coating comprises a hard carbon coating formed by thermally decomposing the hard carbon precursor material.

11. The anode powder of claim 10, wherein the anode powder has a Raman spectroscopy peak intensity ratio of D band/G band above about 0.3.

12. The anode powder of claim 1, wherein the coating has an oxygen content of between about 1% and about 6%.

13. The anode powder of claim 12, wherein the coating has a carbon, oxygen double bond percentage of above about 3%.

14. An anode comprising:
an anode layer disposed on a conductive sheet, said anode layer comprising an electroactive powder, the electroactive powder comprising:
a spheroidized graphite powder; and
a high surface area protective coating surrounding the graphite powder wherein the spheroidized graphite powder and the high surface area protective coating are mechanically mixed without using a solvent to create fused, uniform composite particles;
wherein the high surface area protective coating comprises a uniformly fused metal compound powder coated on the graphite powder and wherein the electroactive powder has a higher surface area than an untreated graphite powder.

15. A battery comprising:
a cathode;
an anode, the anode comprising an anode powder, the anode powder comprising:
a spheroidized graphite powder; and
a high surface area protective coating surrounding the graphite powder wherein the spheroidized graphite powder and the high surface area protective coating are mechanically mixed to create fused, uniform composite particles;
wherein the high surface area protective coating comprises a uniformly fused metal compound powder coated on the graphite powder to form the anode powder and wherein the anode powder has a higher surface area than the untreated graphite powder; and
an electrolyte in ionic communication with both the cathode and the anode.

* * * * *